April 6, 1937. G. A. JOHNSTONE 2,076,464
ALTERNATING CURRENT GENERATOR
Filed Nov. 3, 1934
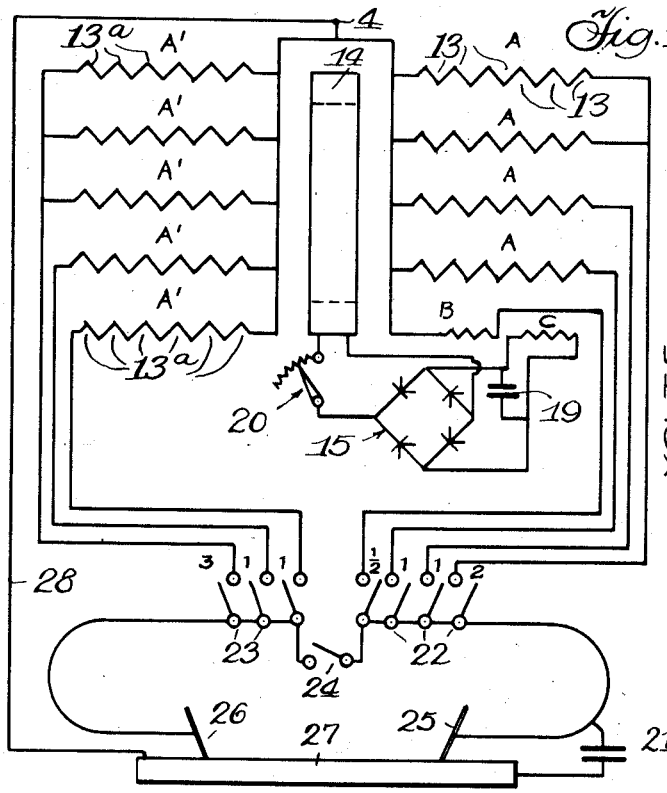
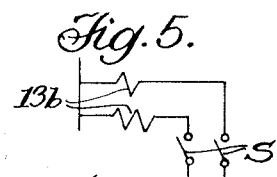
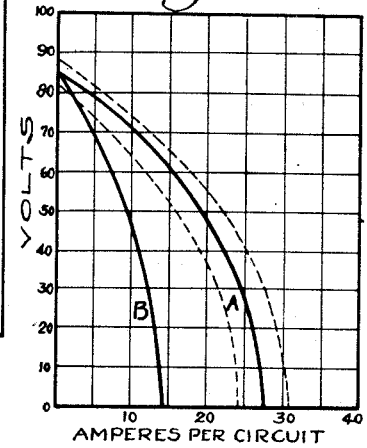
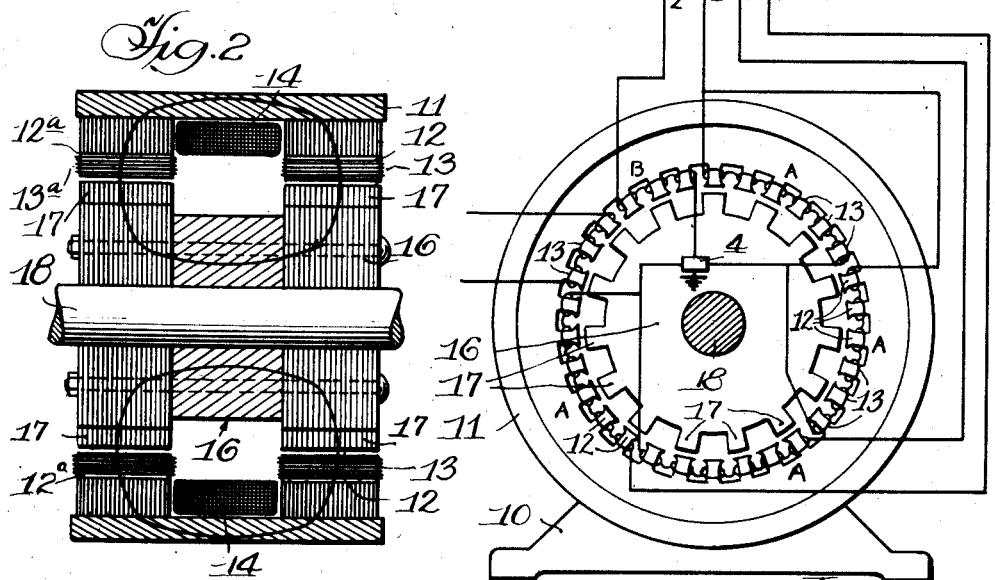
Inventor,
George A. Johnstone,
Dyrenforth, Lee, Chritton & Wiles, Attys.

Patented Apr. 6, 1937

2,076,464

UNITED STATES PATENT OFFICE 2,076,464

ALTERNATING CURRENT GENERATOR

George A. Johnstone, Chicago, Ill.

Application November 3, 1934, Serial No. 751,434

7 Claims. (Cl. 171—224)

This invention relates to alternating current generators designed to supply a number of different circuits which may be used independently of each other or may be connected in groups, in multiple or in series in numerous combinations, by means of switches so as to meet various load requirements. One class of service in which such generators are particularly useful is that of arc welding, in that several welders may perform welding operations at the same time, or, in the case of automatic welding, the same generator may supply current for the welding circuit and may also supply current for the motor that feeds the wire to the arc.

Alternating current generators of the induction type or inductor alternators, of higher frequencies than the usual commercial frequencies or welding frequencies of 25 or 60 cycles and in fact as high as 9000 or more cycles per second, may be designed to give the advantageous results which characterize this invention, although said invention, in certain aspects, is not necessarily limited to inductor type machines.

One object of the invention is to provide a simple, efficient, rugged generator having a plurality of independent circuits of various capacities, capable of being connected in a simple manner, as by means of switches, to supply a plurality of load circuits of widely differing capacities.

Another object is to provide an alternating current generator of the inductor type, capable of supplying multiple circuits for welding circuits.

An additional object is to provide an alternating current generator capable of adjustment to supply various loads, without changing the characteristics of the generator circuits.

Another object is to provide a welding generator capable of delivering high frequency current and having inherent regulation, making it possible under many conditions to dispense with external reactances or resistances.

A further object is to provide an alternating current welding generator having a relatively low open circuit voltage and having a drooping voltage characteristic in the work circuits as required for stability in maintaining an arc, and whereby an excessive flow of current is avoided when a short circuit occurs, as in touching a welding electrode to the work, for example.

Another object is to provide a generator having independent work circuits all having substantially similar characteristics and none being affected materially by the current in any other.

An additional object is to provide a generator of this character, which is self excited and may be driven at relatively high speed, thus enabling it to be direct connected to a gasoline engine of similar speed, resulting in a portable set which is compact, relatively light in weight and of low cost.

A further object is to provide a practical welding generator in the use of which, metal electrode arcs are easy to strike and hold and good penetration is obtained, not only with bare electrodes but with coated rods, particularly those with heavy coatings, and in work where reversed polarity of direct current would be recommended.

In the accompanying drawing I have illustrated a commercial embodiment of my invention, in the form of an inductor alternator, the rotor of which has no windings thereon, no commutator, no brush wear, and which may rotate in either direction. It is operated preferably to deliver 900 cycles per second although, as will be apparent from the following description, a wide range of speed is available, the figure given being selected as a compromise.

Referring to the drawing:

Fig. 1 is a circuit diagram;

Fig. 2 is a somewhat simplified vertical section of the generator;

Fig. 3 is a somewhat diagrammatic side elevation of the same;

Fig. 4 is a graph of voltage-ampere curves for single circuits of the generator; and Fig. 5 is a diagram showing a modification of the stator coil arrangement.

As indicated in Figs. 2 and 3, the generator shown by way of illustration is of the double core type having a base 10, which supports a stator in the form of a fixed ring 11 having two rings therein built up of laminations with teeth forming radially arranged poles 12 and 12ª. These poles are each wound with an individual coil 13 and 13ª, respectively. In this particular design, the stator has sixty teeth, i. e. thirty in each of the two circular rows. The individual coils 13 are connected in groups in series. Any desired number of coils, from one to a maximum, may be connected to form a single group and the various groups may have a different number of coils therein, or several groups may have the same number of coils therein and the remaining groups may each consist of a different number of coils. Thus, by selecting certain desired groups and connecting the same in multiple, as hereinafter described more fully, any desired load capacity may be built up. In the machine shown in the drawing there are six coils in each of the groups except in one group, as shown in Figs. 1 and 3, there being four of such groups on one side of the machine, each indicated by the letter A. The remaining coils on that side are connected in two smaller groups, shown as consisting of three coils each, the coils in each group being in series with each other. One of these groups, B, in Fig. 3, constitutes a circuit having half the capacity of any one of the group of coils A, and may be referred to as a half circuit. The terminals of the group A are marked 1, 1, 2, the first two numbers indicating two individual circuits or groups A, A, and the third number indicating two of the circuits A in multiple, to give twice the current at the same voltage as the other circuits. The terminal of the half circuit B is marked ½.

The remaining circuit C, consisting of three coils in series, furnishes the excitation current for the field coil, as hereinafter described. This number may be varied as required. The coils on the thirty poles 13ª on the other side of the machine are marked A', there being five such circuits of six coils each, said circuits having terminals marked 1, 1 and 3. The first two are independent circuits whereas the one marked 3 is made up of three circuits A' in multiple. The terminal of the common return conductor is marked 4. Thus the two sides of the stator are divided into a total of ten circuits, nine main circuits A and A' of equal capacity, and one circuit B of one-half the capacity of the others, and a separate circuit C which is used for excitation of the field coil.

The field winding 14 is a single coil located in the annular recess between the two rows of poles 13 and 13ª, as shown in Fig. 2. This self excited field winding 14 is supplied with direct current by the circuit C, preferably through a bridge connected full-wave rectifier 15.

The rotor 16 is comprised of a metal drum having two rows of radial teeth 17 on the periphery. In the particular design illustrated, there are fifteen teeth in each row as compared with thirty teeth in the corresponding row on the stator, giving a ratio of one to two, although the number and the ratio may be varied. There are no windings on these rotor teeth, and hence no slip rings, commutator or brushes, are required. The rotor drum is mounted on a suitable shaft 18 which may be direct connected to an internal combustion engine or driven by a belt or by any other suitable source of power. The rotor teeth are made up of laminations.

The magnetic field produced by the field winding is indicated in the upper and lower halves of Fig. 2, from which it will be apparent that as the teeth of the rotor pass the teeth of the stator, the flux through the individual coils 13 and 13ª is built up to a maximum and then reduced to a minimum, producing alternating currents in each coil. There is a substantial air gap between the rotor teeth and the stator teeth, the length of said air gap being almost twice that usually employed in an induction motor. This is an advantage in that any slight off centering of the rotor produces very little percentage variation in the air gaps at different points around the circumference.

As the individual load coils do not completely embrace the main magnetic circuit, the fields of the individual coils do not materially affect the fields of the adjacent coils or interfere with them from the standpoint of reactance or inductance. Thus variations in the current in the several work circuits do not cause material variations in the coils which supply current to the field winding, with the result that the energization of the latter is uniform at all times.

This type of generator has been operated at frequencies ranging from 60 to 9000 cycles per second, these high frequency currents having shown important advantages in various fields of service, more particularly in metal arc welding and other arc applications of heat. The inherent characteristics of such generators make them particularly suitable for supplying electric arcs, and both construction and operating advantages are obtainable over direct current welding generators. The higher frequencies lend themselves to the use of condensers in connection with the excitation of the field circuit. In Fig. 1 such a condenser is shown at 19 and also a rheostat 20 is shown in the same circuit. Also, condensers may be employed in the work circuits, as illustrated at 21, for example. However, satisfactory results are obtained without condensers. Furthermore, the field rheostat is not essential. Also, the field may be operated well below the saturation point.

The high reactance of the field coil at 900 cycles, i. e. 3600 R. P. M. aids the operation of the rectifier and permits the use of the smallest number of units in series for the voltage needed. From the standpoint of arc welding, even higher frequencies appear to have advantages. Operation at 900 cycles per second represents a satisfactory compromise partly because of losses in the core and rectifier at higher frequencies. Also, the corresponding speed of 3600 R. P. M. is satisfactory for structural reasons.

The particular generator described herein has an efficiency of 80% or higher for 200 ampere capacity and larger sizes. A 7½ horse power motor is suitable for the 200 ampere size and a 10 horse power motor for a 300 ampere size.

The circuits shown in Fig. 1 may be connected in various ways, depending on the class of service called for. In Fig. 1 a possible arrangement is shown wherein a series of switches 22 are used to close circuits from the terminals ½, 1, 1, 2, from the groups of coils A and B on one side of the generator, and switches 23 may be used to close circuits to terminals 1, 1, 3 from the coils A' on the other side of the generator. The voltage of all of the groups of coils A is the same, and in like manner the voltage of each of the groups of coils A' is the same as that of any other group A' and may be assumed to be 85 volts. The various switches connect one or more of said groups in parallel and an additional switch 24 is provided to connect the circuits on one side to those at the other side. The circuit from the switches 22 may lead to an arc welding electrode 25 and that from the other switches 23 may lead to an arc welding electrode 26, each cooperating with one or more metal work pieces 27 connected to the common return conductor 28 which leads to the terminal 4. These illustrative circuits will serve one operator with two arcs or two operators with one arc each for welding. By a proper switching arrangement, including the necessary taps, there may be as many welding operators as there are circuits, i. e. 9 or 10 in this case, or the circuits may be combined to give greater current capacity to fewer operators. Such switches afford all the control necessary and may be plainly marked either in amperes or otherwise, to indicate almost exactly the value of the current available for a given setting.

Fig. 5 is a partial circuit diagram comprising a modification corresponding in other respects to the upper part of the Fig. 1 diagram. Whereas in Fig. 1 there are six coils, 13 and 13a in each of the groups marked A and A', there may be as a minimum one coil only as shown at 13b. In a parallel circuit there may be two coils 13b, 13b, in series with each other, and in another parallel circuit there may be a greater number of coils, the design being such that the voltage of each group is the same. Each of these local groups, containing one or more coils 13b, as shown in Fig. 5, may have a switch S to connect the same in circuit as in the case of Fig. 1 also.

With the construction and circuits heretofore described, a combination of loads may obviously be supplied by the same alternator, such, for example, as a plurality of welding circuits and also a three phase motor circuit which might be used to operate a grinder or an automatic welding machine.

In Fig. 4 I have shown volt-ampere curves for the single circuits of the particular generator illustrated in Figs. 1, 2 and 3. The curve A indicates a full circuit and the curve B a half circuit, the latter using half as many poles as the main circuit and having twice the number of turns per pole. However, the characteristics are exactly proportional to those of a main circuit and are used to provide a smaller step in adjusting a welding current to the value desired, thereby increasing the flexibility of the generator. The dotted curves show values of current and voltage obtainable by field adjustment, although, as stated, a field rheostat generally is unnecessary.

In this graph all the circuits have like characteristics and none is affected by the current in any other. Therefore, the shape of the volt-ampere curve will be the same for all values of current obtained when several circuits are connected in multiple. For example, one main circuit A may give 27½ amperes short circuited, 26 amperes at 25 volts, and 85 volts on open circuit. If eight main circuits are used in multiple, the short circuit current will be eight times that of one main circuit, i. e. 220 amperes; the load current at 25 volts will be eight times 26 amperes or 208 amperes, and the open circuit voltage will be 85 as before. These ratios obtain for any number of circuits. It will be seen that by the necessary arrangement of switches and taps, several circuits may be used in series for higher open circuit voltages, or separate combinations of circuits may use different voltages if not used in multiple. The characteristics of all such circuits will be similar and the short circuit ampere turns per pole for all will be the same for any given field strength. These characteristics are entirely inherent in the generator with no external reactance or resistance necessary and in fact a set without a field rheostat or even without instruments is entirely practical from an operating standpoint.

Although, as stated, all circuits are substantially independent of each other for all practical purposes, there is a small compounding effect in connection with the voltage regulation. If, for example, all but one of these circuits are short circuited, the voltage on the open circuit will have a permanent rise of about 2% with a 2% drop in speed when the generator is self excited, and the field ammeter will show a corresponding permanent increase in field current. When the generator is separately excited, as it may be from any constant potential direct current source, the field ammeter will show a small upward kick of about the same magnitude as the permanent rise when self excited, not more than 5% of the maximum throw of the needle. This slight compounding effect is the only evidence of any interrelation of the various circuits.

When short circuits are made and broken, as for example by a welder wiping his rod holder quickly across the edge of the grounding base, there are no surges of more than 10% above normal in either voltage or current, and, furthermore, the voltage and current values, as indicated by oscillographs, show practically normal conditions immediately after the short circuit is broken or is established.

Among the numerous advantages of the generator, many of which have been mentioned heretofore, it may be pointed out that with the usual welding generators when the machine is adjusted for its normal load it has certain characteristics, whereas when it is adjusted for a smaller load the characteristics are radically changed. With my generator, in using a small load, even a load small enough to correspond to a single coil, the characteristics remain the same.

I claim:

1. An alternating current generator of the inductor type comprising a stator having pole pieces, individual coils on said pole pieces embracing only a part of the entire magnetic flux, individual circuits from said coils, and switches connected to said circuits, whereby more than one generator circuit at a time, several circuits in multiple or any combination of said circuits may be established and held within close limits of voltage and current with no excessive surges, when a short circuit occurs.

2. An alternating generator of the inductor type comprising a stator having poles, a coil for each pole, successive coils being connected in series in independent groups to provide a generating circuit of certain load capacity, the load capacity of some of said group circuits being different from others, the volt-ampere characteristics of all of said group circuits being similar, as described herein, and switches connected to said circuits whereby more than one circuit at a time or several circuits in series or in multiple, in various combinations, may be used to supply circuits of different load capacities, the inherent regulation serving to limit the surges of voltage and current within about 10% above normal, when the circuit is momentarily short circuited.

3. An inductor alternator comprising stationary pole pieces, each with an individual coil thereon embracing a part only of the entire magnetic flux, not embraced by any other coil, the circuits of said coils having the same volt-ampere characteristics, as described herein, and a rotor having a less number of pole pieces than said stator and operating at a speed to produce frequencies between 100 and 1000 cycles per second, local circuits connected to said coils, and switches in said circuits whereby different types of load circuits may be provided for different coils, or greater current capacity for a smaller number of load circuits, may be provided.

4. A double induction generator for alternating current comprising a stator having two spaced apart rows of teeth, a field coil between said two rows, single coils surrounding said teeth and each embracing an exclusive portion of the magnetic circuit established by said field coil, the circuits of all of said coils having the same volt-ampere characteristics, as described herein, said coils being connected in groups in series, all but one of said groups having the same load capacity as the remaining groups, said one group being divided into two circuits, each of less load capacity, taps and switches for said groups, whereby they may be connected in multiple or in series in various combinations including one of two circuits of less load capacity, the other of said two circuits being connected to said field coil.

5. A double induction generator for alternating current comprising a stator having two spaced apart rows of teeth, each equal in number to the other, a rotor having no more than one-half the number of teeth in either row on the stator, a field coil between said two rows, a single coil surrounding each of said teeth and each embracing an exclusive portion of the magnetic circuit established by said field coil, the circuits of all of said coils having the same characteristics, including a low, open circuit voltage and a decidedly drooping voltage characteristic, certain of said coils being connected to said field coil to provide self excitation for the same, the coils on some of the teeth in one row being connected at one end to a common terminal, the coils on some of the teeth in the other row being connected at one end to a second terminal, and an additional terminal for a common return conductor from the opposite ends of said coils.

6. A double induction generator for alternating current, comprising a stator having two spaced apart rows of teeth, a field coil between said two rows, a rectifier connected to said field coil, a single coil surrounding each of said teeth, the circuits of all of said coils having the same volt-ampere characteristics, as described herein, a small number of said coils being connected to said field coil through said rectifier to provide direct current self excitation for the same, the coils of all of the remaining teeth in both rows being connected to switches, whereby a wide variety of circuits may be supplied by said coils.

7. An alternating current generator comprising a stator and a rotor, coils on one of said elements whereby relative movement between the two elements will induce alternating currents in said coils, the operating characteristics of the circuit of each coil, as described herein, being substantially independent of and unaffected by the others, and means whereby one circuit comprising one coil only or a plurality of circuits may be used to supply circuits of different load capacities, wherein a drooping voltage characteristic is realized.

GEORGE A. JOHNSTONE.